US012573701B2

(12) United States Patent
Davis et al.

(10) Patent No.: US 12,573,701 B2
(45) Date of Patent: Mar. 10, 2026

(54) MODULAR BATTERY PACK

(71) Applicant: Covestro LLC, Pittsburgh, PA (US)

(72) Inventors: Terry Davis, Kimball, MI (US); Nathalie Capati, Washington, DC (US); Gregoire Aby-Eva, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 546 days.

(21) Appl. No.: 18/247,837

(22) PCT Filed: Oct. 5, 2021

(86) PCT No.: PCT/US2021/053471
§ 371 (c)(1),
(2) Date: Apr. 4, 2023

(87) PCT Pub. No.: WO2022/081375
PCT Pub. Date: Apr. 21, 2022

(65) Prior Publication Data

US 2023/0335853 A1 Oct. 19, 2023

Related U.S. Application Data

(60) Provisional application No. 63/150,749, filed on Feb. 18, 2021, provisional application No. 63/090,314, filed on Oct. 12, 2020.

(51) Int. Cl.
*H01M 50/258* (2021.01)
*H01M 50/213* (2021.01)
(Continued)

(52) U.S. Cl.
CPC ....... *H01M 50/258* (2021.01); *H01M 50/213* (2021.01); *H01M 50/227* (2021.01);
(Continued)

(58) Field of Classification Search
CPC .......................... H01M 50/213; H01M 50/258
See application file for complete search history.

(56) References Cited

U.S. PATENT DOCUMENTS

| | | | |
|---|---|---|---|
| 2,393,967 | A | 2/1946 | Brubaker |
| 3,419,634 | A | 12/1968 | Vaughn, Jr. |

(Continued)

FOREIGN PATENT DOCUMENTS

| | | | |
|---|---|---|---|
| CN | 102195010 | A | 9/2011 |
| DE | 961668 | C | 4/1957 |

(Continued)

OTHER PUBLICATIONS

"Vinyl and Related Polymers" by Schildknecht, John Wiley & Sons, Inc., New York, 1962, pp. 484-494.

(Continued)

*Primary Examiner* — Hosung Chung
(74) *Attorney, Agent, or Firm* — Richard P. Bender

(57) ABSTRACT

Provided is a modular battery pack having six sides comprises a plurality of battery cells, a first and second cell holder having openings or notches to receive the ends of the battery cells, an electrical outlet connected to the plurality of battery cells, two plates attached to the sides of the cell holders, and two side housings that together form four sides of the modular battery pack, while the two plates form a fifth and a sixth side of the battery pack.

17 Claims, 16 Drawing Sheets

(51) Int. Cl.
*H01M 50/227* (2021.01)
*H01M 50/249* (2021.01)
*H01M 50/264* (2021.01)

(52) U.S. Cl.
CPC ....... *H01M 50/249* (2021.01); *H01M 50/264* (2021.01); *H01M 2220/20* (2013.01)

(56) References Cited

U.S. PATENT DOCUMENTS

| | | | |
|---|---|---|---|
| 3,553,167 | A | 1/1971 | Schnell et al. |
| 3,654,575 | A | 4/1972 | Cluwen |
| 3,671,487 | A | 6/1972 | Abolins |
| 3,723,373 | A | 3/1973 | Lucas |
| 3,838,092 | A | 9/1974 | Vogt et al. |
| 4,075,173 | A | 2/1978 | Maruyama et al. |
| 4,311,823 | A | 1/1982 | Shozaburo et al. |
| 4,334,053 | A | 6/1982 | Freitag et al. |
| 4,584,360 | A | 4/1986 | Paul et al. |
| 6,093,759 | A | 7/2000 | Gareiss et al. |
| 2019/0020001 | A1 | 1/2019 | Nakano et al. |
| 2019/0305395 | A1 | 10/2019 | Favaretto et al. |
| 2021/0057690 | A1 | 2/2021 | Fukutome et al. |
| 2021/0075077 | A1 | 3/2021 | Kwag |

FOREIGN PATENT DOCUMENTS

| | | | |
|---|---|---|---|
| DE | 2232877 | A1 | 1/1974 |
| DE | 2714544 | A1 | 10/1977 |
| DE | 3007934 | A1 | 9/1981 |
| DE | 3832396 | A1 | 2/1990 |
| EP | 0728811 | A2 | 8/1996 |
| EP | 2355205 | A1 | 8/2011 |
| KR | 1020200020565 | A | 2/2020 |
| WO | 2017132575 | A1 | 8/2017 |

OTHER PUBLICATIONS

International Search Report for PCT/US2021/053471 issued by Authorized officer Schmidtbauer, H on Jan. 17, 2022.
“Fluorpolymers” by Wall, Wiley-Interscience, John Wiley & Sons, Inc., New York, vol. 13, 1970, pp. 623-654.
“Modern Plastics Encyclopedia”, 1970-1971, vol. 47, No. 10 A, Oct. 1970, McGraw-Hill, Inc., New York, pp. 134 and 774.
“Modern Plastics Encyclopedia”, 1975-1976, Oct. 1975, vol. 52, No. 10 A, McGraw-Hill, Inc., New York, pp. 27, 28 and 472.

MODULAR BATTERY PACK

CROSS REFERENCE TO RELATED APPLICATIONS

This application is a national stage application under 35 U.S.C. § 371 of PCT/US2021/053471, filed Oct. 5, 2021, which claims the benefit of U.S. Provisional Application Ser. No. 63/090,314, filed Oct. 12, 2020, and U.S. Provisional Application Ser. No. 63/150,749, filed Feb. 18, 2021, all of which are incorporated herein by reference in their entireties.

FIELD OF THE INVENTION

The present invention relates in general to a device for holding an array of battery cells in a modular pack inside of a moving vehicle, such as a light electric vehicle.

SUMMARY OF THE INVENTION

In an embodiment, a modular battery pack having six sides comprises a plurality of battery cells, each cell having a first end and a second end; a first cell holder having a first side and a second side disposed opposite the first side, the first side having openings or notches to receive the first end of the battery cells; a second cell holder having a first side and a second side disposed opposite the first side, the first side having openings or notches to receive the second end of the battery cells; an electrical outlet connected to the plurality of battery cells; a first plate attached to the second side of the first cell holder; a second plate attached to the second side of the second cell holder; and a first side housing and a second side housing that together form four sides of the modular battery pack, wherein the first plate forms a fifth side of the battery pack, and wherein the second plate forms a sixth side of the battery pack.

In another embodiment, the first cell holder comprises slats on the second side, and may further comprise fittings on the second side. The modular battery pack may, in a different embodiment, further comprise a thermally conductive adhesive in contact with a battery cell and one of the first plate and the second plate. In another, the modular battery pack further comprises bus bars in contact with one of the first cell holder and the second cell holder.

In yet another embodiment, the first cell holder and the second cell holder may comprise polycarbonate, and may further comprise at least one compound selected from the group consisting of acrylonitrile butadiene styrene, polytetrafluorethylene, an aromatic phosphate ester, a phosphazene, bisphenol-A diphenyl phosphate, triphenyl phosphate and resorcinol bis-diphenyl phosphate. In a different embodiment, the first cell holder and the second cell holder comprise thermally conductive polycarbonate.

In an embodiment not yet disclosed, the first side housing and the second side housing are constructed of a thermoplastic, preferably polycarbonate, and may also comprise at least one compound selected from the group consisting of acrylonitrile butadiene styrene, polytetrafluorethylene, an aromatic phosphate ester, a phosphazene, bisphenol-A diphenyl phosphate, triphenyl phosphate and resorcinol bis-diphenyl phosphate.

In still another embodiment, the first plate and/or the second plate comprise a metal, preferably over 80% metal, preferably aluminum. In another, the first plate and/or the second plate comprise thermally conductive polycarbonate.

In a different embodiment, the first plate or the second plate further comprise cooling channels.

In a different embodiment of the invention, each of the six sides of the modular battery pack face 90 degrees apart from four other sides, and 180 degrees apart from one other side. In another embodiment, two of the sides comprise metal plates, and may be predominately metal, while four of the sides are substantially plastic, and may be predominately plastic.

In yet another embodiment, the first side housing and the second side housing substantially envelope the first plate, the second plate, the first cell holder, the second cell holder, and the battery cells. In another, the first side housing and the second side housing together protrude further in any direction, than the first plate and the second plate.

In another embodiment, the modular battery pack further comprises foam disposed between the first cell holder and the second cell holder, preferably wherein the foam has a thermal conductivity of 1 W/m-K or greater.

In another, an electric vehicle comprises a modular battery pack of any of the above.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
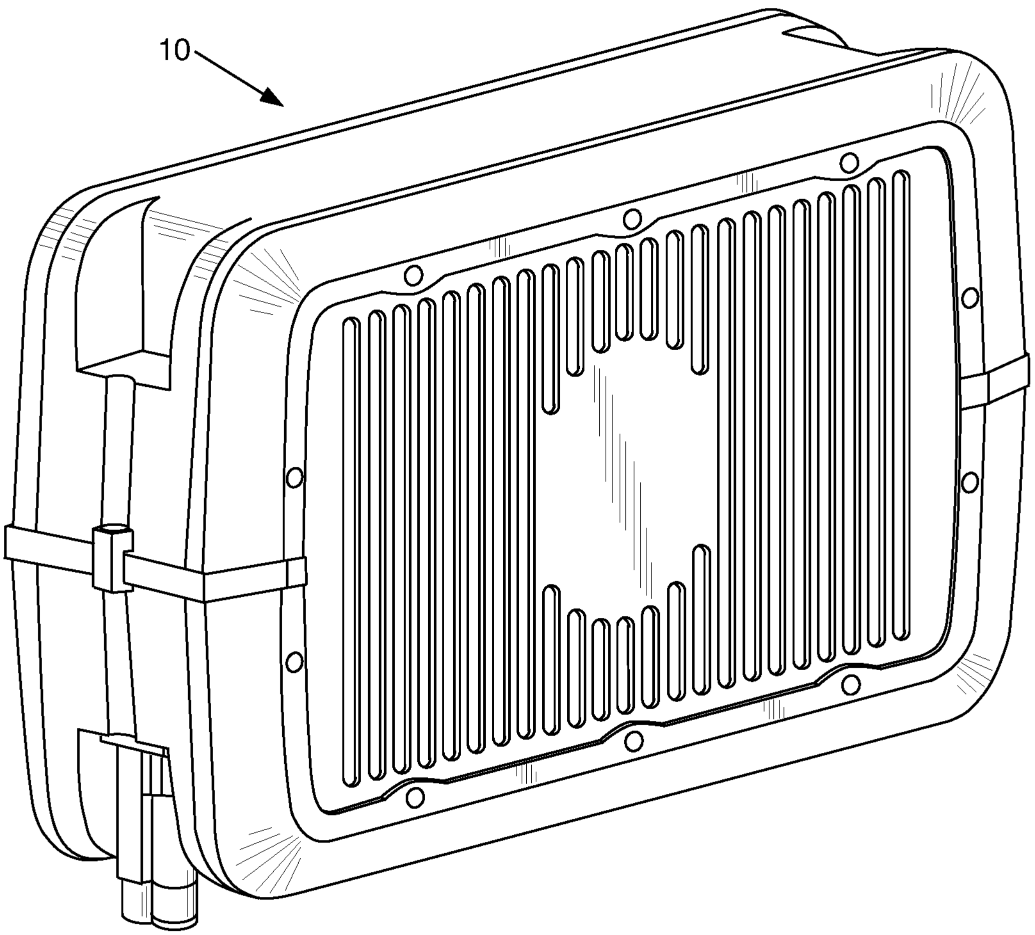
FIG. 1 is a perspective view of a modular battery pack of the present invention, with the second plate shown.

The present invention provides a modular battery pack, which may be used in a light electric vehicle, such as an electric scooter or rickshaw. A battery pack used in such applications, should be compact, impact-resistant, and modular so it may be connected to other battery packs as needed. As described herein, the battery is configured to hold an array of battery cells in a secure manner for a moving vehicle. Polycarbonate molded parts surround the array of battery cells on four sides, while metals plates surround the cells on two sides, providing both structural strength and impact resistance, while also providing the ability to cool battery cells during operation.

The modular battery pack comprises an array of battery cells that are held by two cell holders on opposite sides of the array. The cell holders may be made from flame resistant polycarbonate, polycarbonate and acrylonitrile butadiene-styrene (ABS) blend, a thermally conductive polycarbonate, or a blend of such materials. One of the cell holders may have bus bars to assist in thermal conductivity for cooling.

The modular battery pack also comprises two plates, which are preferably substantially flat and parallel to each other, and preferably a metal such as aluminum, or a thermally conductive polycarbonate, to provide both structural stability and thermal conductivity. In addition, thermally conductive polycarbonate can increase the life of the battery cell, as it is able to cool the battery more efficiently, and reduce the operating temperature. Two plastic parts, preferably comprising primarily polycarbonate, fit around the array of battery cells, cell holders and plates, and surround the battery cells on four sides, and preferably overmount the plates, providing impact resistance for the battery pack in case the electric vehicle is involved in an accident. Finally, the modular battery pack comprises electrical connections from the battery cells to the outside of the modular battery pack.

Polycarbonate

Aromatic polycarbonates and/or aromatic polyester carbonates that are suitable are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g., DE-A 3 007 934).

The preparation of aromatic polycarbonates is carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerization process by reaction of diphenols with, for example, diphenyl carbonate is also possible.

Diphenols for the preparation of the aromatic polycarbonates and/or aromatic polyester carbonates are preferably those of formula (I)

(I)

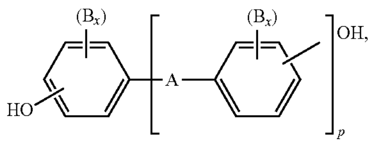

wherein

A is a single bond, $C_1$-$C_5$-alkylene, $C_2$-$C_5$-alkylidene, $C_5$-$C_6$-cyclo-alkylidene, O, SO—, —CO—, —S—, —$SO_2$—, $C_6$-$C_{12}$-arylene, to which further aromatic rings optionally containing heteroatoms can be fused, or a radical of formula (II) or (III)

(II)

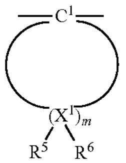

(III)

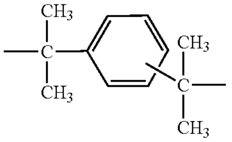

B is in each case $C_1$-$C_{12}$-alkyl, preferably methyl, halogen, preferably chlorine and/or bromine, x each independently of the other is 0, 1 or 2, p is 1 or 0, and $R^5$ and $R^6$ can be chosen individually for each $X^1$ and each independently of the other is hydrogen or $C_1$-$C_6$-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxy-phenyl) sulfoxides, bis-(hydroxyphenyl) ketones, bis-(hydroxyphenyl)-sulfones and α,α-bis-(hydroxy-phenyl)-diisopropyl-benzenes, and derivatives thereof brominated and/or chlorinated on the ring.

Particularly preferred diphenols are 4,4'-dihydroxydiphenyl, bisphenol A, 2,4-bis(4-hydroxy-phenyl)-2-methylbutane, 1,1-bis-(4-hydroxyphenyl)-cyclohexane, 1,1-bis-(4-hydroxy-phenyl)-3,3,5-trimethylcyclohexane, 4,4'-dihydroxydiphenyl sulfide, 4,4'-dihydroxydiphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxy-phenyl)-propane. 2,2-Bis-(4-hydroxyphenyl)-propane (bisphenol A) is particularly preferred.

The diphenols can be used on their own or in the form of arbitrary mixtures. The diphenols are known in the literature or are obtainable according to processes known in the literature.

Chain terminators suitable for the preparation of thermoplastic aromatic polycarbonates are, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethyl-butyl)-phenol according to DE-A 2 842 005 or monoalkylphenol or dialkylphenols having a total of from 8 to 20 carbon atoms in the alkyl substituents, such as 3,5-di-tert-butyl-phenol, p-isooctylphenol, p-tert-octylphenol, p-dodecyl-phenol and 2-(3,5-dimethyl-heptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean molecular weights (weight-average $M_w$, measured by GPC (gel permeation chromatography) with polycarbonate standard) of from 15,000 to 80,000 g/mol, preferably from 19,000 to 32,000 g/mol, particularly preferably from 22,000 to 30,000 g/mol.

The thermoplastic aromatic polycarbonates can be branched in a known manner, preferably by the incorporation of from 0.05 to 2.0 mol %, based on the sum of the diphenols used, of compounds having a functionality of three or more than three, for example those having three or more phenolic groups. Preference is given to the use of linear polycarbonates, more preferably based on bisphenol A.

Both homopolycarbonates and copolycarbonates are suitable. For the preparation of copolycarbonates of component A it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. Also suitable are copolycarbonates containing polydiorganosiloxanes; the preparation of copolycarbonates containing polydiorganosiloxanes is described, for example, in DE-A 3 334 782.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as bifunctional acid derivative.

Suitable chain terminators for the preparation of the aromatic polyester carbonates, in addition to the monophenols already mentioned, are also the chlorocarbonic acid esters thereof and the acid chlorides of aromatic monocarboxylic acids, which can optionally be substituted by $C_1$-$C_{22}$-alkyl groups or by halogen atoms, as well as aliphatic $C_2$-$C_{22}$-monocarboxylic acid chlorides.

The amount of chain terminators is in each case from 0.1 to 10 mol %, based in the case of phenolic chain terminators on mol of diphenol and in the case of monocarboxylic acid chloride chain terminators on mol of dicarboxylic acid dichloride.

One or more aromatic hydroxycarboxylic acids can additionally be used in the preparation of aromatic polyester carbonates.

The aromatic polyester carbonates can be both linear and branched in known manner (see in this connection DE-A 2 940 024 and DE-A 3 007 934), linear polyester carbonates being preferred.

There can be used as branching agents, for example, carboxylic acid chlorides having a functionality of three or more, such as trimesic acid trichloride, cyanuric acid trichloride, 3,3', 4,4'-benzophe-none-tetracarboxylic acid tetrachloride, 1,4,5,8-naphthalene-tetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxy-phenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxy-phenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxy-phenyl-isopropyl]-phenoxy)-methane, 1,4-bis [4,4'-dihydroxy-triphenyl)-methyl]-benzene, in amounts of from 0.01 to 1.0 mol %, based on diphenols used. Phenolic branching agents can be placed in a vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The thermoplastic aromatic polycarbonates and polyester carbonates can be used on their own or in an arbitrary mixture.

Other Components

In some compositions, a thermally conductive additive may be included, especially in those parts or portions of parts, which may assist in cooling the batteries through transfer of heat to the plate or other parts. Such an additive may be graphene, graphite, aluminum or other metal particles, carbon fiber, or other conductor, or thermally conductive polymers. In a preferred embodiment, expanded graphite is the thermally conductive additive.

Expanded graphite and methods of its production are known to those skilled in the art. Expanded graphite may be present in an amount ranging from 10% to 70% of the composition of the present invention, more preferably from 20% to 60% and most preferably from 30% to 50%. The expanded graphite may be present in the composition of the present invention in an amount ranging between any combination of these values, inclusive of the recited values. The present inventors have found that at least 90% of the particles of the expanded graphite should have a particle size of at least 200 microns.

The plastic molded part may further comprise at least one compound selected from the group consisting of acrylonitrile butadiene styrene (ABS), polytetrafluorethylene, an aromatic phosphate ester, a phosphazene, bisphenol-A diphenyl phosphate, triphenyl phosphate and resorcinol bis-diphenyl phosphate.

Phosphazenes which are used are cyclic phosphazenes according to formula (X)

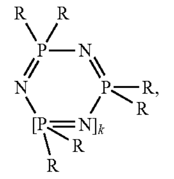
(X)

wherein

R is in each case identical or different and represents an amine radical, $C_1$-$C_8$-alkyl, preferably methyl, ethyl, propyl or butyl, each optionally halogenated, preferably halogenated with fluorine, more preferably monohalogenated, $C_1$-$C_8$-alkoxy, preferably methoxy, ethoxy, propoxy or butoxy, $C_5$-$C_6$-cyclo-alkyl each optionally substituted by alkyl, preferably $C_1$-$C_4$-alkyl, and/or by halogen, preferably chlorine and/or bromine, $C_6$-$C_{20}$-aryloxy, preferably phenoxy, naphthyloxy, each optionally substituted by alkyl, preferably $C_1$-$C_4$-alkyl, and/or by halogen, preferably chlorine, bromine, and/or by hydroxy, $C_7$-$C_{12}$-aralkyl, preferably phenyl-$C_1$-$C_4$-alkyl, each optionally substituted by alkyl, preferably $C_1$-$C_4$-alkyl, and/or by halogen, preferably chlorine and/or bromine, or a halogen radical, preferably chlorine or fluorine, or an OH radical, k has the meaning mentioned above.

Preference is given to: propoxyphosphazene, phenoxyphosphazene, methylphenoxyphosphazene, aminophos-phazene and fluoroalkylphosphazenes, as well as phosphazenes having the following structures:

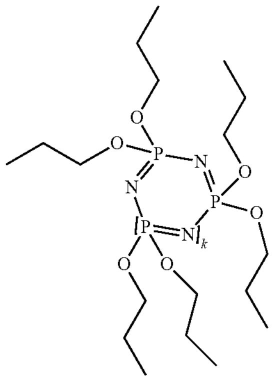

-continued

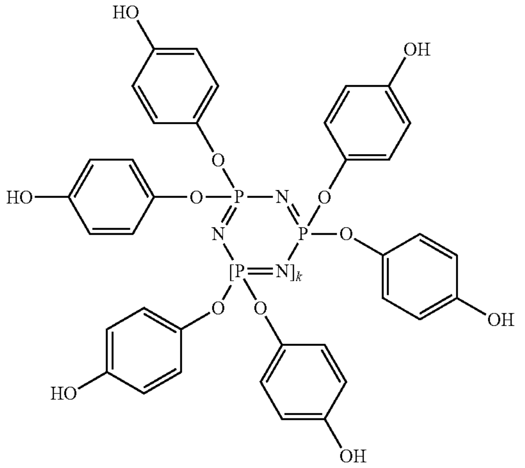

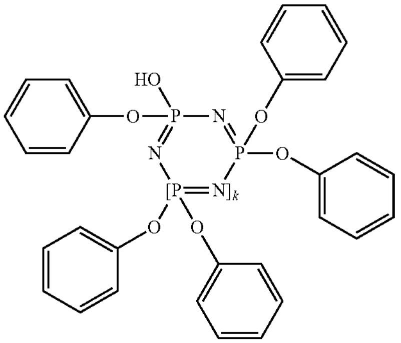

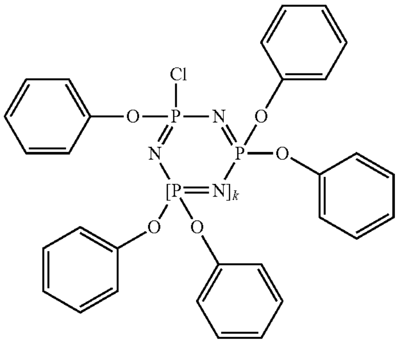

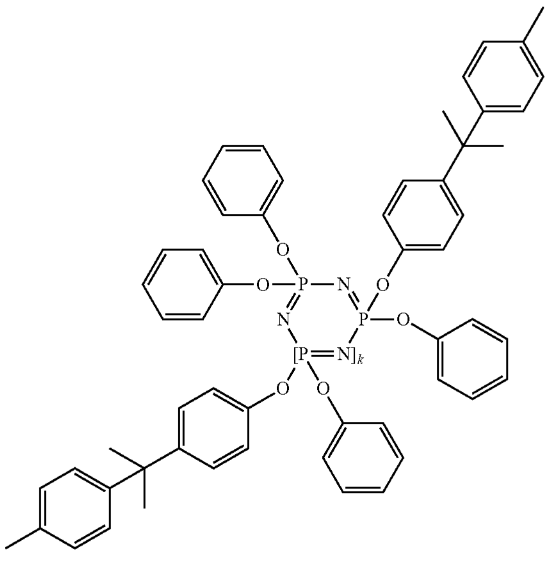

-continued

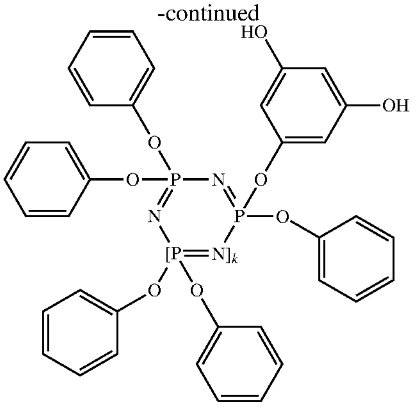

In the compounds shown above, k=1, 2 or 3.

Preference is given to phenoxyphosphazene (all R=phenoxy) having a content of oligomers with k=1 (C1) of from 60 to 98 mol %.

(XI)

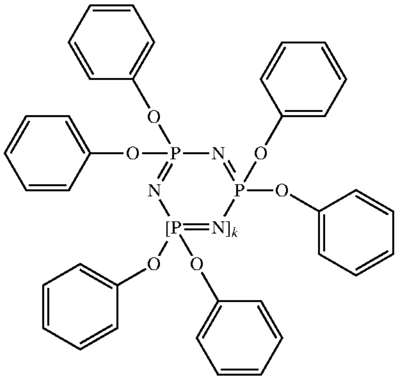

In the case where the phosphazene according to formula (X) is halo-substituted on the phosphorus, for example from incompletely reacted starting material, the content of this phosphazene halo-substituted on the phosphorus is preferably less than 1000 ppm, more preferably less than 500 ppm.

The phosphazenes can be used on their own or in the form of a mixture, that is to say the radical R can be identical or two or more radicals of formula (X) can be different. The radicals R of a phosphazene are preferably identical.

In a further preferred embodiment, only phosphazenes with identical R are used. In a preferred embodiment, the content of tetramers (k=2) (C2) is from 2 to 50 mol %, based on the amount of phosphazene, more preferably from 5 to 40 mol %, yet more preferably from 10 to 30 mol %, particularly preferably from 10 to 20 mol %.

In a preferred embodiment, the content of higher oligomeric phosphazenes (k=3, 4, 5, 6 and 7) (C3) is from 0 to 30 mol %, based on the amount of phosphazene, more preferably from 2.5 to 25 mol %, yet more preferably from 5 to 20 mol % and particularly preferably from 6 to 15 mol %.

In a preferred embodiment, the content of oligomers with k>=8 (C4) is from 0 to 2.0 mol %, based on the amount of phosphazene, and preferably from 0.10 to 1.00 mol %.

In a further preferred embodiment, the phosphazenes fulfil all three conditions mentioned above as regards the contents (C2–C4).

The phosphazene is preferably a phenoxyphosphazene with a trimer content (k=1) of from 65 to 85 mol %, a tetramer content (k=2) of from 10 to 20 mol %, a content of higher oligomeric phosphazenes (k=3, 4, 5, 6 and 7) of from 5 to 20 mol % and of phosphazene oligomers with k>=8 of from 0 to 2 mol %, based on the total amount of the phosphazene.

The phosphazene is particularly preferably a phenoxyphosphazene with a trimer content (k=1) of from 70 to 85 mol %, a tetramer content (k=2) of from 10 to 20 mol %, a content of higher oligomeric phosphazenes (k=3, 4, 5, 6 and 7) of from 6 to 15 mol % and of phosphazene oligomers with k>=8 of from 0.1 to 1 mol %, based on the total amount of the phosphazene.

In a further particularly preferred embodiment, the phosphazene is a phenoxyphosphazene with a trimer content (k=1) of from 65 to 85 mol %, a tetramer content (k=2) of from 10 to 20 mol %, a content of higher oligomeric phosphazenes (k=3, 4, 5, 6 and 7) of from 5 to 15 mol % and of phosphazene oligomers with k>=8 of from 0 to 1 mol %, based on the total amount of the phosphazene.

n defines the weighted arithmetic mean of k according to the following formula:

$$n = \frac{\sum_{i=1}^{max} ki \cdot xi}{\sum_{i=1}^{max} xi}$$

where xi is the content of the oligomer ki, and the sum of all xi is accordingly 1.

In an alternative embodiment, n is in the range from 1.10 to 1.75, preferably from 1.15 to 1.50, more preferably from 1.20 to 1.45, and particularly preferably from 1.20 to 1.40 (including the limits of the ranges).

The phosphazenes and their preparation are described, for example, in EP A 728 811, DE A 1 961668 and WO 97/40092.

The oligomer compositions of the phosphazenes in the blend samples can also be detected and quantified, after compounding, by means of $^{31}$P NMR (chemical shift; δ trimer: 6.5 to 10.0 ppm; δ tetramer: −10 to 13.5 ppm; δ higher oligomers: −16.5 to −25.0 ppm).

The plastic molded part can comprise further conventional polymer additives, such as flame-retardant synergists other than antidripping agents, lubricants and release agents (for example pentaerythritol tetrastearate), nucleating agents, stabilizers (for example UV/light stabilizers, heat stabilizers, antioxidants, transesterification inhibitors, hydrolytic stabilizers), antistatics (for example conductive blacks, carbon fibers, carbon nanotubes as well as organic antistatics such as polyalkylene ethers, alkyl sulfonates or polyamide-containing polymers) as well as colorants, pigments, fillers, talc and reinforcing materials, in particular glass fibers, mineral reinforcing materials and carbon fibers.

There are preferably used as stabilizers sterically hindered phenols and phosphites or mixtures thereof, such as, for example, IRGANOX B900 (Ciba Speciality Chemicals). Pentaerythritol tetrastearate is preferably used as the release agent. Carbon black is further preferably used as a black pigment (e.g., BLACK PEARLS).

As well as comprising optional further additives, particularly preferred molding compositions comprise a release agent, particularly preferably pentaerythritol tetrastearate, in an amount of from 0.1 to 1.5 parts by weight, preferably from 0.2 to 1.0 part by weight, particularly preferably from 0.3 to 0.8 part by weight. As well as comprising optional further additives, particularly preferred molding compositions comprise at least one stabilizer, for example selected from the group of the sterically hindered phenols, phosphites and mixtures thereof and particularly preferably IRGANOX B900, in an amount of from 0.01 to 0.5 part by weight, preferably from 0.03 to 0.4 part by weight, particularly preferably from 0.06 to 0.3 part by weight.

As noted above, the composition of the plastic molded part may further comprise an antidripping agent polytetrafluoroethylene (PTFE) or PTFE-containing compositions such as, for example, masterbatches of PTFE with styrene- or methyl-methacrylate-containing polymers or copolymers, in the form of powders or in the form of a coagulated mixture.

The fluorinated polyolefins used as antidripping agents have a high molecular weight and have glass transition temperatures of over −30° C., generally over 100° C., fluorine contents of preferably from 65 to 76 wt. %, in particular from 70 to 76 wt. %, mean particle diameters $d_{50}$ of from 0.05 to 1000 μm, preferably from 0.08 to 20 μm. In general, the fluorinated polyolefins have a density of from 1.2 to 2.3 g/cm$^3$. Preferred fluorinated polyolefins are polytetrafluoroethylene, polyvinylidene fluoride, tetrafluoroethylene/hexafluoropropylene and ethylene/tetrafluoroethylene copolymers. The fluorinated polyolefins are known (see "Vinyl and Related Polymers" by Schildknecht, John Wiley & Sons, Inc., New York, 1962, pages 484-494; "Fluorpolymers" by Wall, Wiley-Interscience, John Wiley & Sons, Inc., New York, Volume 13, 1970, pages 623-654; "Modern Plastics Encyclopedia", 1970-1971, Volume 47, No. 10 A, October 1970, McGraw-Hill, Inc., New York, pages 134 and 774; "Modern Plastics Encyclopedia", 1975-1976, October 1975, Volume 52, No. 10 A, McGraw-Hill, Inc., New York, pages 27, 28 and 472 and U.S. Pat. Nos. 3,671,487, 3,723,373 and 3,838,092).

They can be prepared by known processes, for example by polymerization of tetrafluoroethylene in an aqueous medium with a free-radical-forming catalyst, for example sodium, potassium or ammonium peroxodisulfate, at pressures of from 7 to 71 kg/cm$^2$ and at temperatures of from 0 to 200° C., preferably at temperatures of from 20 to 100° C. (For further details see e.g., U.S. Pat. No. 2,393,967.) Depending on the form in which they are used, the density of these materials can be from 1.2 to 2.3 g/cm$^3$, and the mean particle size can be from 0.05 to 1000 μm.

The fluorinated polyolefins that are preferred have mean particle diameters of from 0.05 to 20 μm, preferably from 0.08 to 10 μm, and density of from 1.2 to 1.9 g/cm$^3$.

Suitable fluorinated polyolefins which can be used in powder form are tetrafluoroethylene polymers having mean particle diameters of from 100 to 1000 μm and densities of from 2.0 g/cm$^3$ to 2.3 g/cm$^3$. Suitable tetrafluoroethylene polymer powders are commercial products and are supplied, for example, by DuPont under the trade name TEFLON.

As well as comprising optional further additives, particularly preferred flame-retardant compositions comprise a fluorinated polyolefin in an amount of from 0.05 to 5.0 parts by weight, preferably from 0.1 to 2.0 parts by weight, particularly preferably from 0.3 to 1.0 part by weight of the composition of the plastic molded part.

In an embodiment, the plastic molded part is substantially electrically nonconductive and thermally conductive.

Additional materials of construction, such as a thermally conductive adhesive, foam or other thermally conductive materials, are discussed in relation to embodiments discussed below.

Modular Battery Pack

Figure 2:
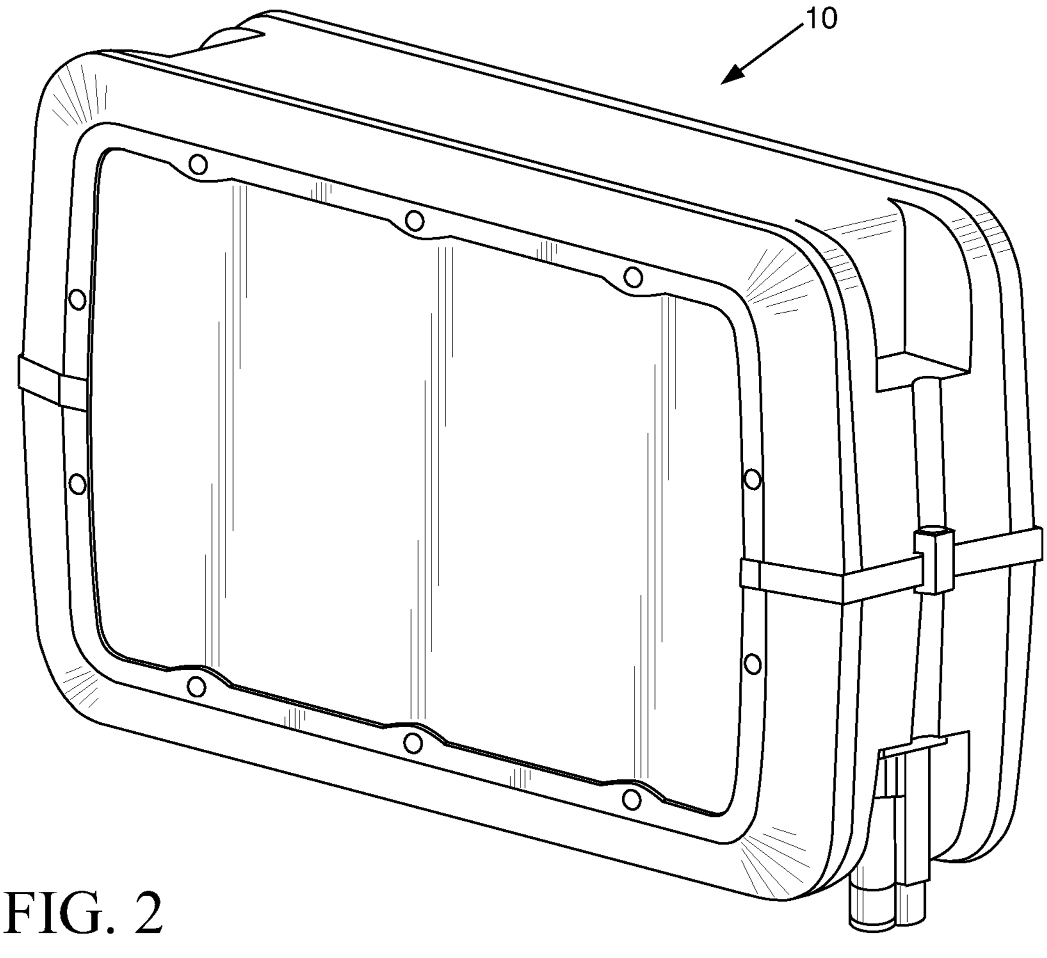
FIG. 2 is another perspective view of the modular battery pack of FIG. 1, with the first plate shown.
Figure 3:
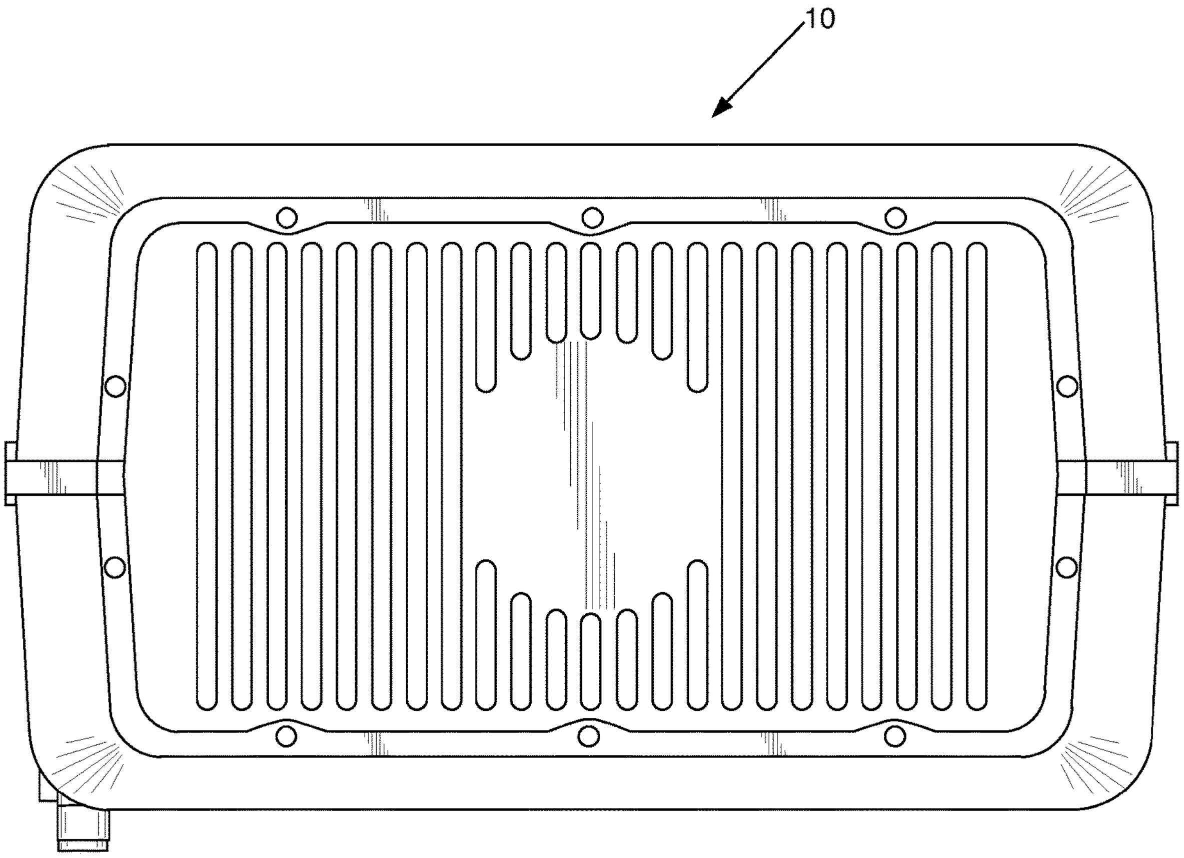
FIG. 3 is a rear view of the modular battery pack of FIG. 1.

One embodiment of the present invention, modular battery pack 10, is shown in FIG. 1. FIGS. 2 and 3 show additional views of modular battery pack 10. While descriptions of front and back may be used herein, modular battery pack 10 may be used in any orientation. Such descriptions are merely to alight the various parts described herein.

Figure 4:
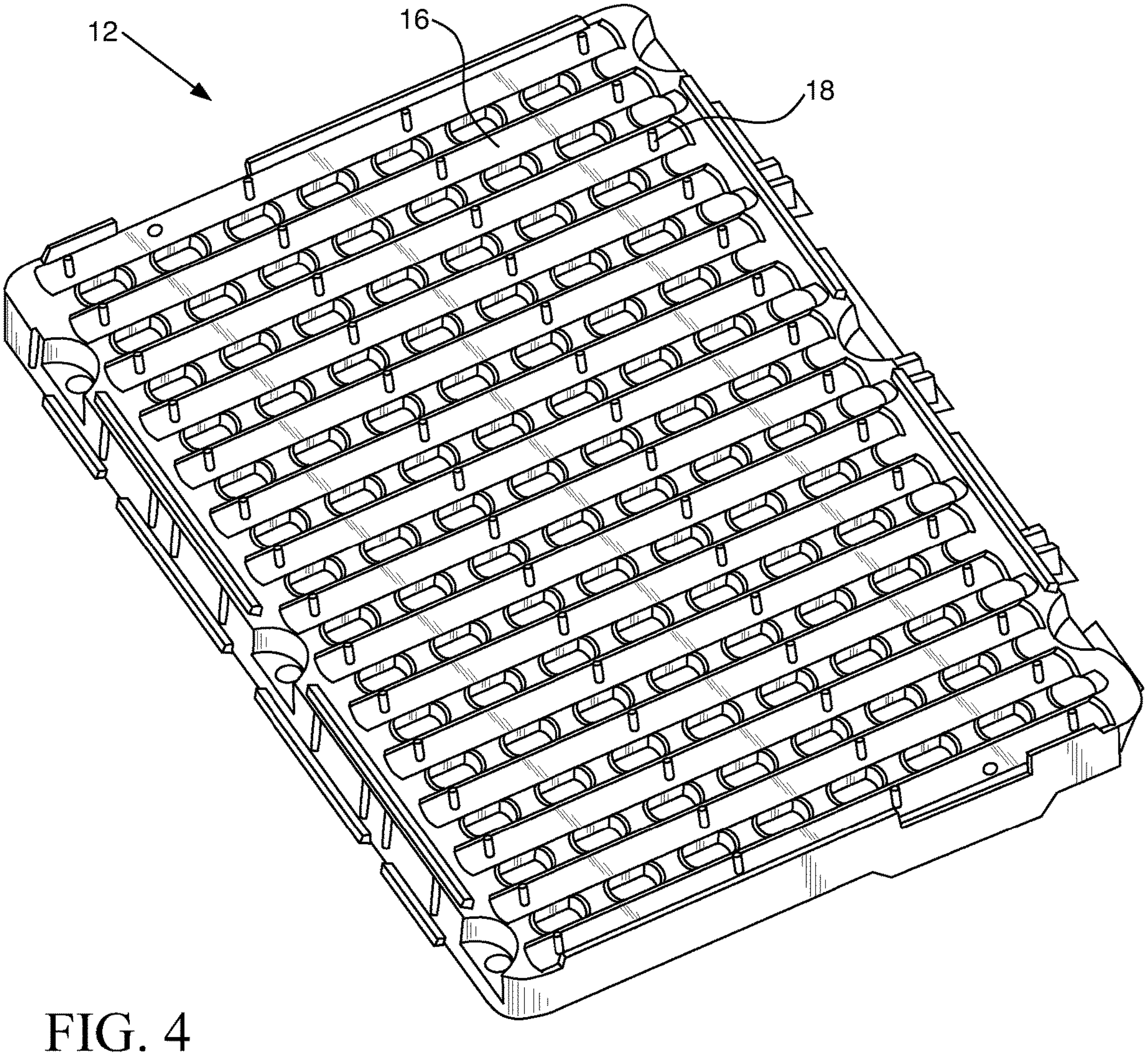
FIG. 4 is a perspective view of the first cell holder, showing the first exterior facing side.
Figure 5:
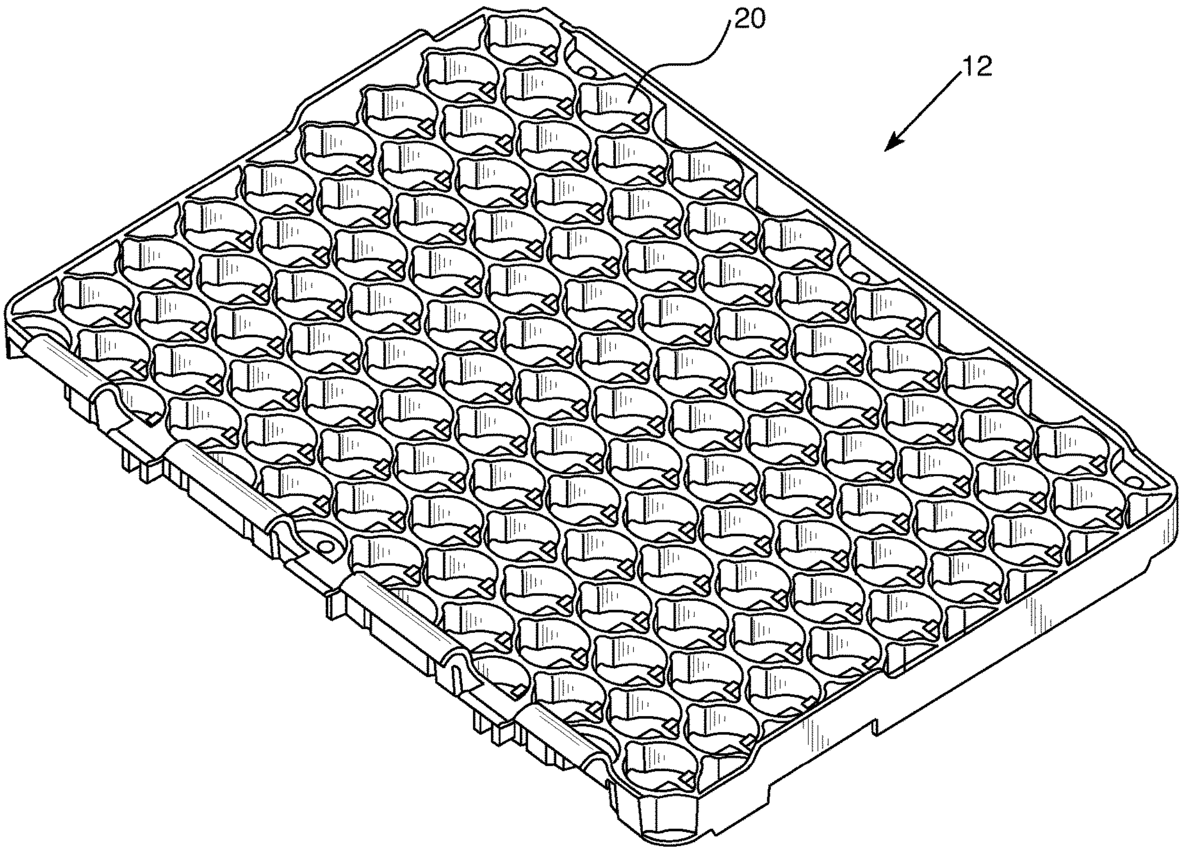
FIG. 5 is a perspective view of the first cell holder, showing the side facing the battery cells.
Figure 6:
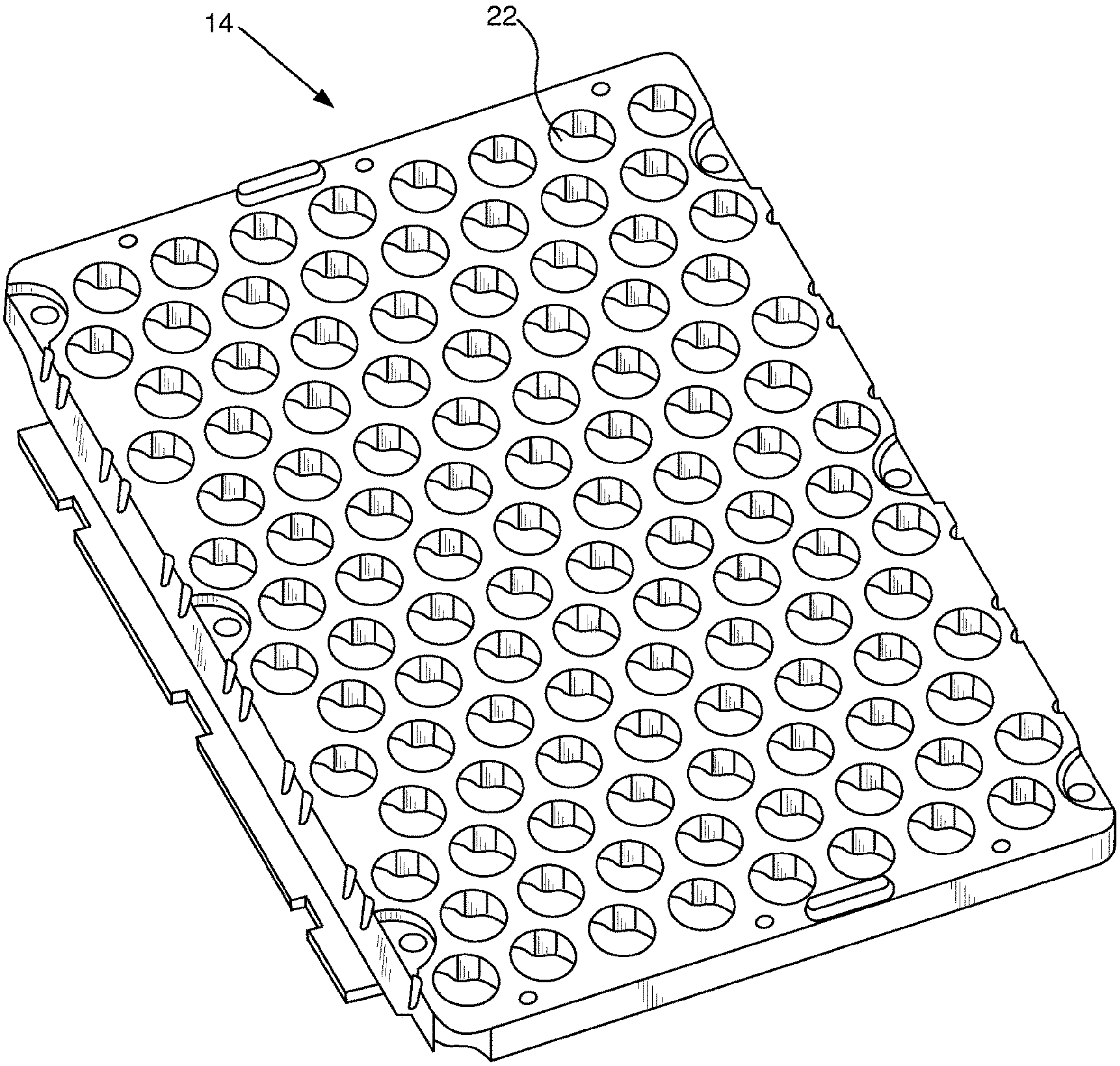
FIG. 6 is a perspective view of the second cell holder, showing the second exterior facing side.
Figure 7:
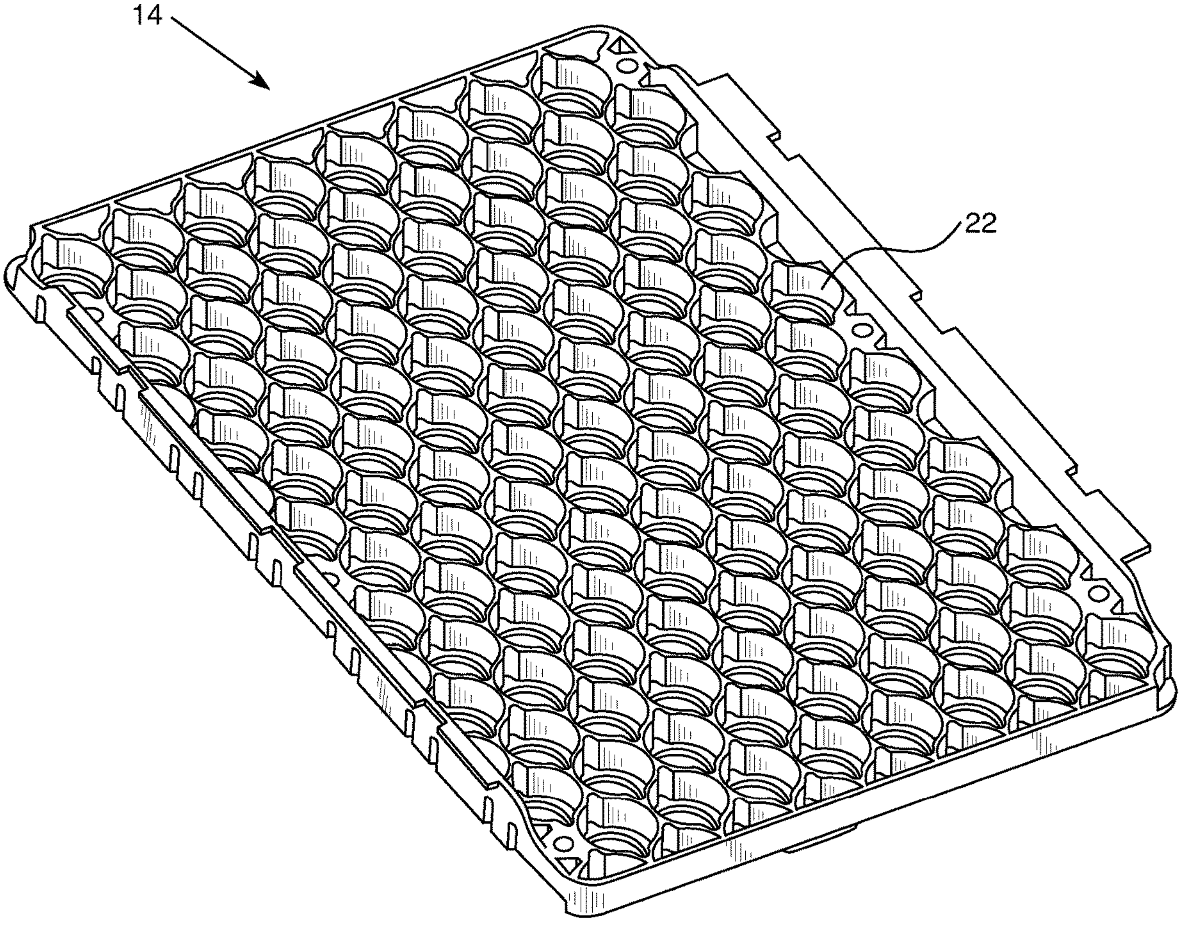
FIG. 7 is a perspective view of the second cell holder, showing the side facing the battery cells.

FIG. 4 shows first cell holder 12, with the exterior side shown facing up. On the exterior side, there are slats 16 and fittings 18, designed to fit bus bars as described herein. FIG. 5 shows first cell holder 12, with the interior side shown facing up. This side includes openings 20 to hold battery cells. FIG. 6 shows second cell holder 14, with the exterior side shown facing up. On the exterior side, openings 22 for battery cells may be seen. FIG. 7 shows second cell holder 14, with the interior side shown facing up. This view also shows battery cell openings 22.

Figure 8:
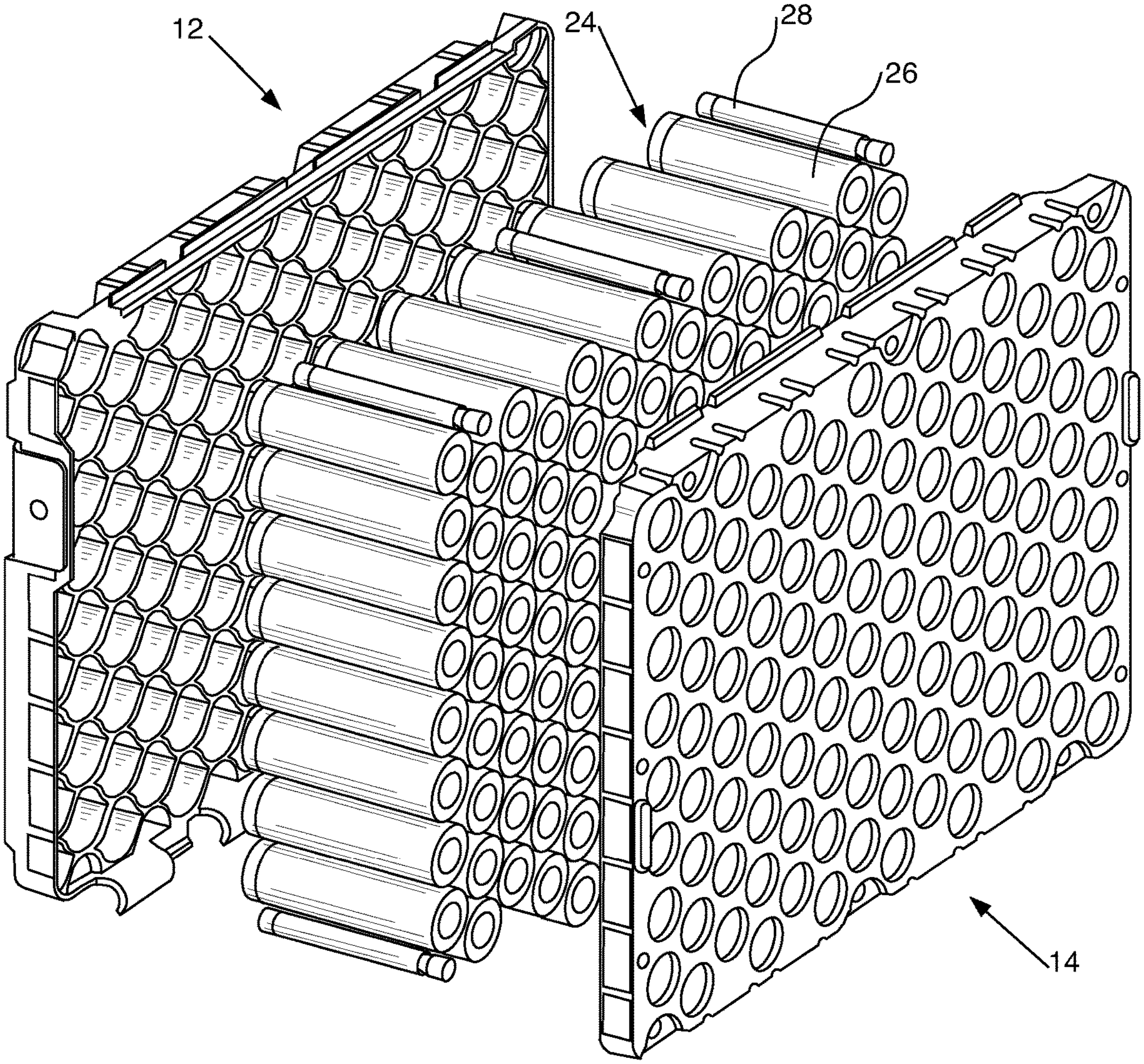
FIG. 8 is an exploded view of an array of battery cells, and the first and second cell holders.
Figure 9:
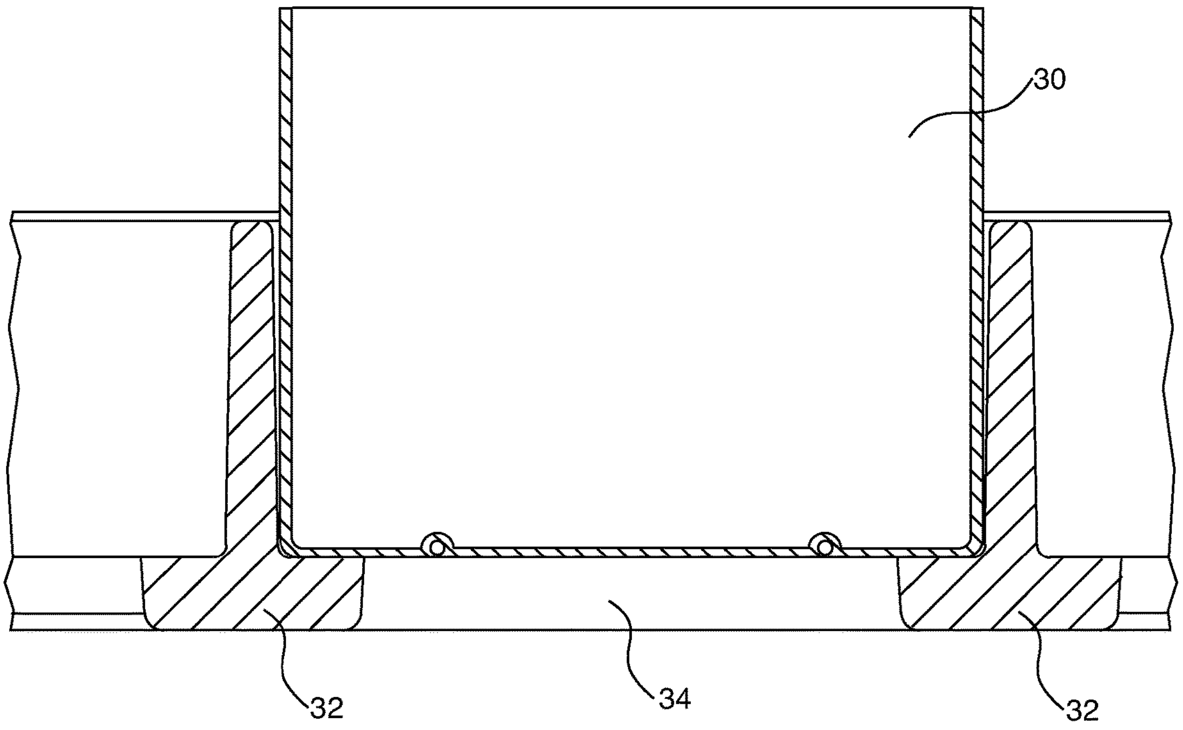
FIG. 9 is a cross section view of a portion of the second cell holder and a battery cell.
Figure 10:
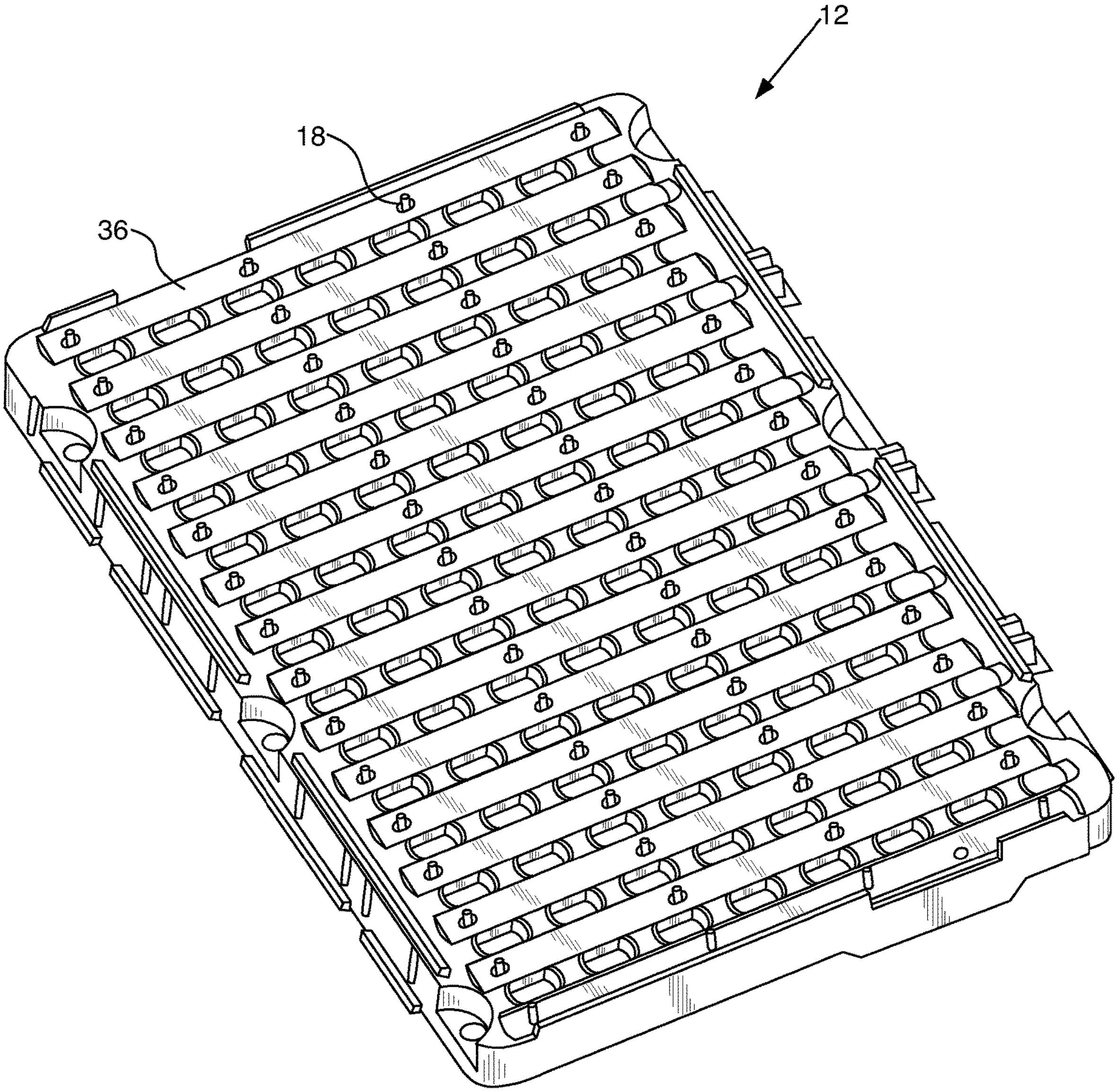
FIG. 10 is a perspective view of the first cell holder, showing the first exterior facing side with bus bars attached.
Figure 11:
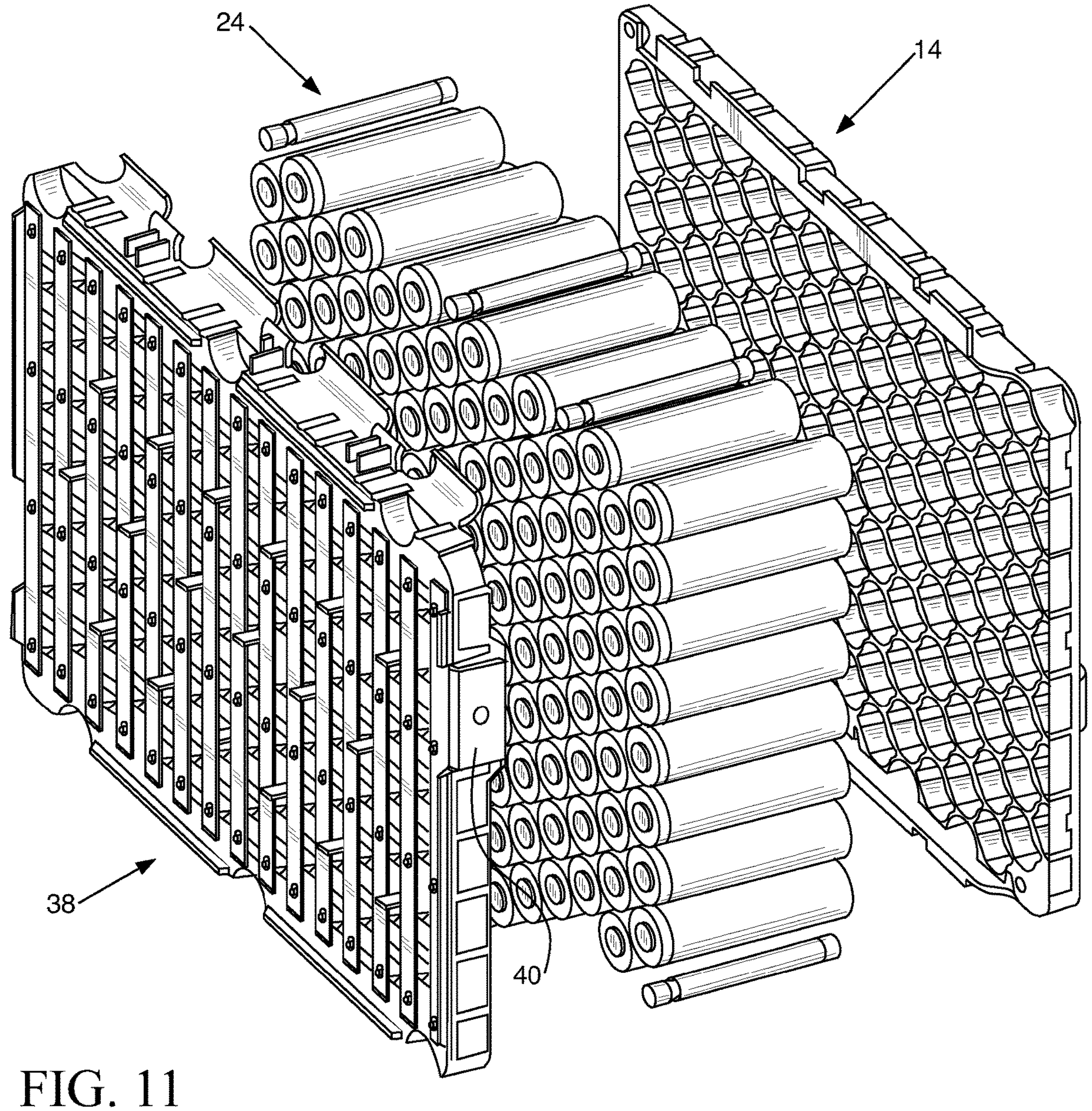
FIG. 11 is another exploded view of the array of battery cells, the first and second cell holders, and with the bus bars attached.
Figure 12:
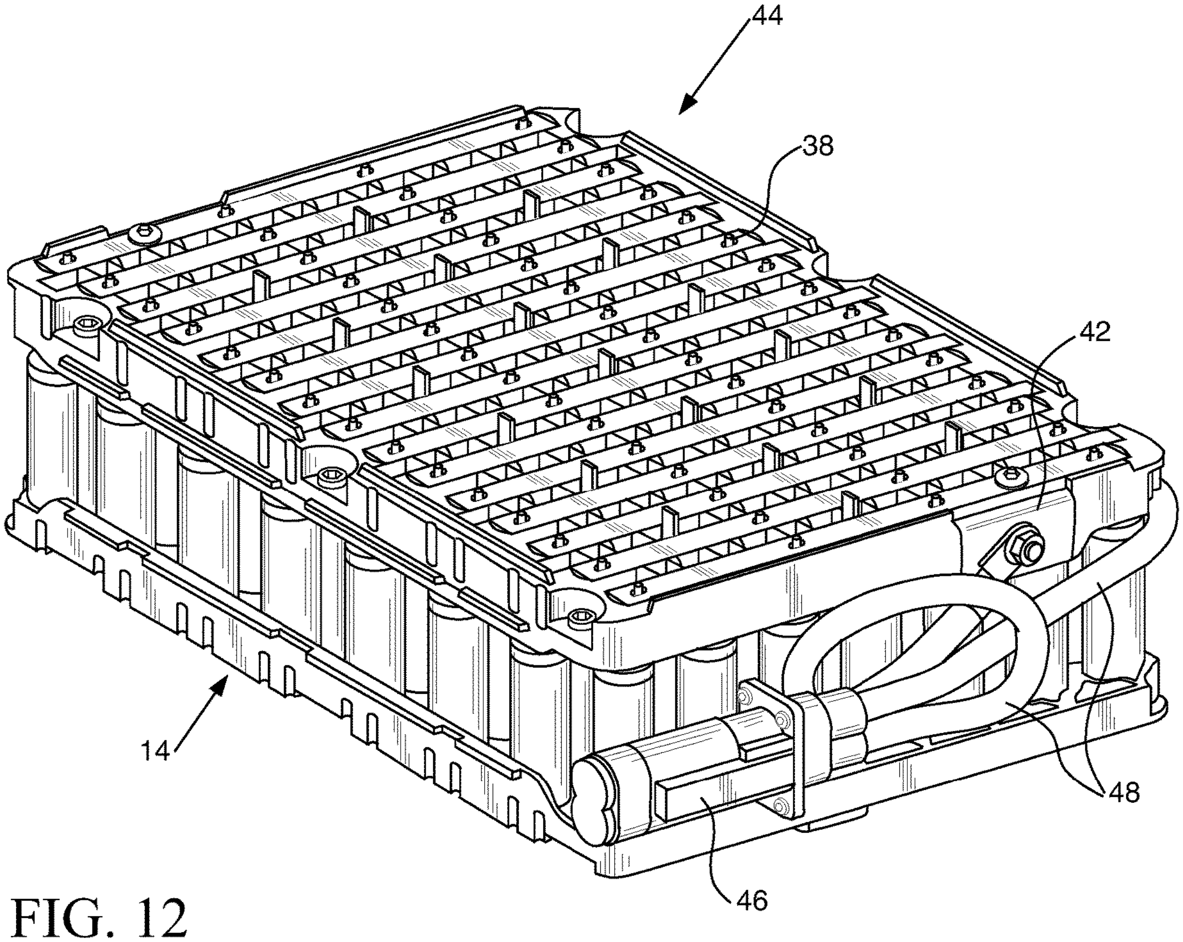
FIG. 12 is a perspective view of the array of battery cells, with the first and second cell holders attached, and with electrical connections attached.
Figure 13:
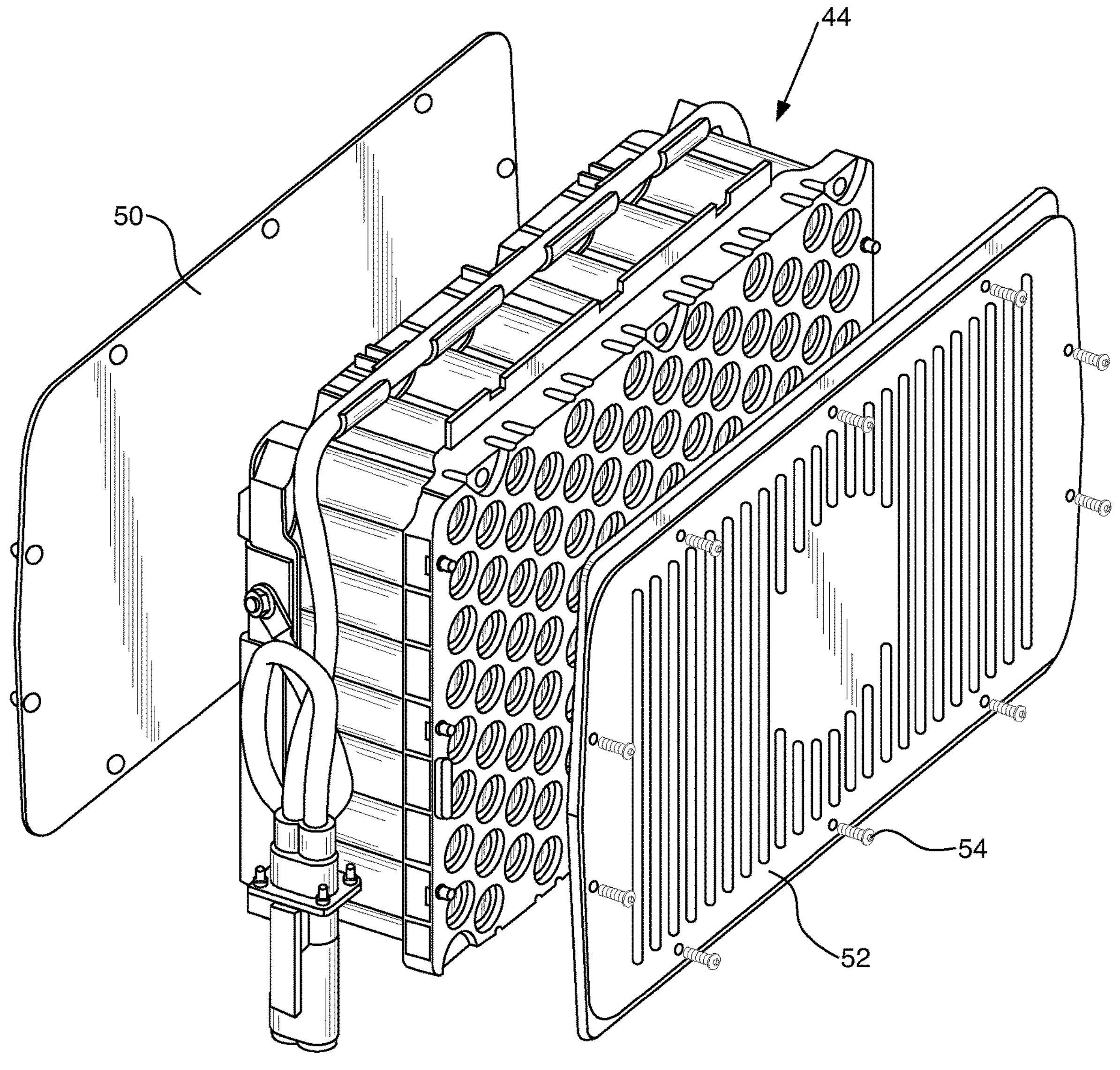
FIG. 13 is an exploded view of the array of battery cells, with the first and second cell holders and electrical connections attached, along with the first and second plates.

FIG. 8 shows how an array 24 of battery cells 26 fit in with first cell holder 12 and second cell holder 14. Also shown are structural elements 28 which may be present to provide structural support, as well as impact resistance by virtue of their positioning along the edge and corners of array 24. FIG. 9 shows a cross section of a cell holder holding a battery cell 30. Section 32 is a part of a cell holder, which as noted above may be constructed of polycarbonate, including a thermally conductive polycarbonate. Battery cell 30 may be further held in place by a thermally conductive adhesive 34, which assists in cooling battery cell 30. Thermally conductive adhesive 34 attaches to battery cell 30, section 32, as well as any surface that may abut the cell holder, through an opening 20 or 22, as shown in FIGS. 5-7. As shown in FIG. 13 below, second plate 52 abuts second cell holder 14, and thus thermally conductive adhesive 34 will also attach to second plate 52. As shown in FIG. 10, bus bars 36 are placed on the exterior side of first cell holder 12, retained and aligned in place by fittings 18. FIG. 11 shows how array 24 fits in with first cell holder with bus bars 38 and second cell holder 14. Also shown, is opening 40 for electrical connections (not shown) to each of the battery cells. FIG. 12 shows the battery holder wired assembly 44, comprising first cell holder with bus bars 38, second cell holder 14 and array 24. Also shown are electrical connector 42, electrical outlet plug 46, connected by insulated wires 48.

In an embodiment of the invention not shown, foams consisting of one- or two-part polyurethane or other suitable chemistry produce a cell structure to fill the space between the battery cells in the array. The foam may be confined to the immediate area around the cells, such as between the first cell holder and the second cell holder, or it may fill the entire module space between the first plate and the second plate. The foam may absorb impact forces improving crash performance, provide improved electrical resistance by increasing creepage distance and improve moisture resistance and thermal management of the module.

In one embodiment, foam with a thermal conductivity of 1 W/m-K or greater can provide a thermal path to or from the cells allowing the cells to be cooled or heated depending on operating conditions. In another embodiment, insulating foam can be used as a thermal break, having the ability to contain or slow flame propagation in a thermal runaway event.

The foam used may be of sufficiently low viscosity prior to curing, such that it can be poured into the module prior to final assembly or injected through ports in the module housing post assembly. The volume of foam introduced is calibrated to its expansion properties to avoid excessive overfill and expansion forces on the module. The modular battery pack may further comprise internal dam features to block the foam from filling areas where it is not necessary to fill with foam.

FIG. 13 shows battery holder wired assembly 44, first plate 50 and second plate 52, which each attach to battery holder wired assembly 44 by connectors 54. First plate 50 is adjacent to first cell holder with bus bars 38, and second plate 52 is adjacent to second cell holder 14. In an embodiment, first plate 50 does not touch any of the bus bars directly on first cell holder with bus bars 38, but rather is kept off-set from the bus bars to avoid creating a short circuit. Fittings 18 (shown in FIG. 10) as well as other supports may keep first plate 50 from touching any bus bars. In contrast, second plate 52 may touch second cell holder 14 directly, as well as thermally conductive adhesive 34, to form a thermal circuit from battery cells 30 to second plate 52 for thermal cooling. Second plate 52 is preferably made of a conductive metal such as aluminum and is of a sufficient thickness to act as a thermal conductor for cooling of the batteries within assembly 44, while first plate 50 may be a metal of thinner construction and may only provide structural strength and minimal cooling. Each of first plate 50 and second plate 52 may comprise 80% or greater by weight of aluminum. Alternatively, each of first plate 50 and second plate 52 may be constructed of a thermally conductive polycarbonate. In another embodiment, first plate 50 is constructed of a polycarbonate that is not thermally conductive. In another embodiment, the second plate is an active cooling plate, meaning it comprises cooling channels and a coolant runs through the cooling channels within the second plate, or touching the second plate, to actively cool the plate during operation of the battery cells. In this embodiment, the second plate may further comprise inlets and outlets for the cooling channel.

Figure 14:
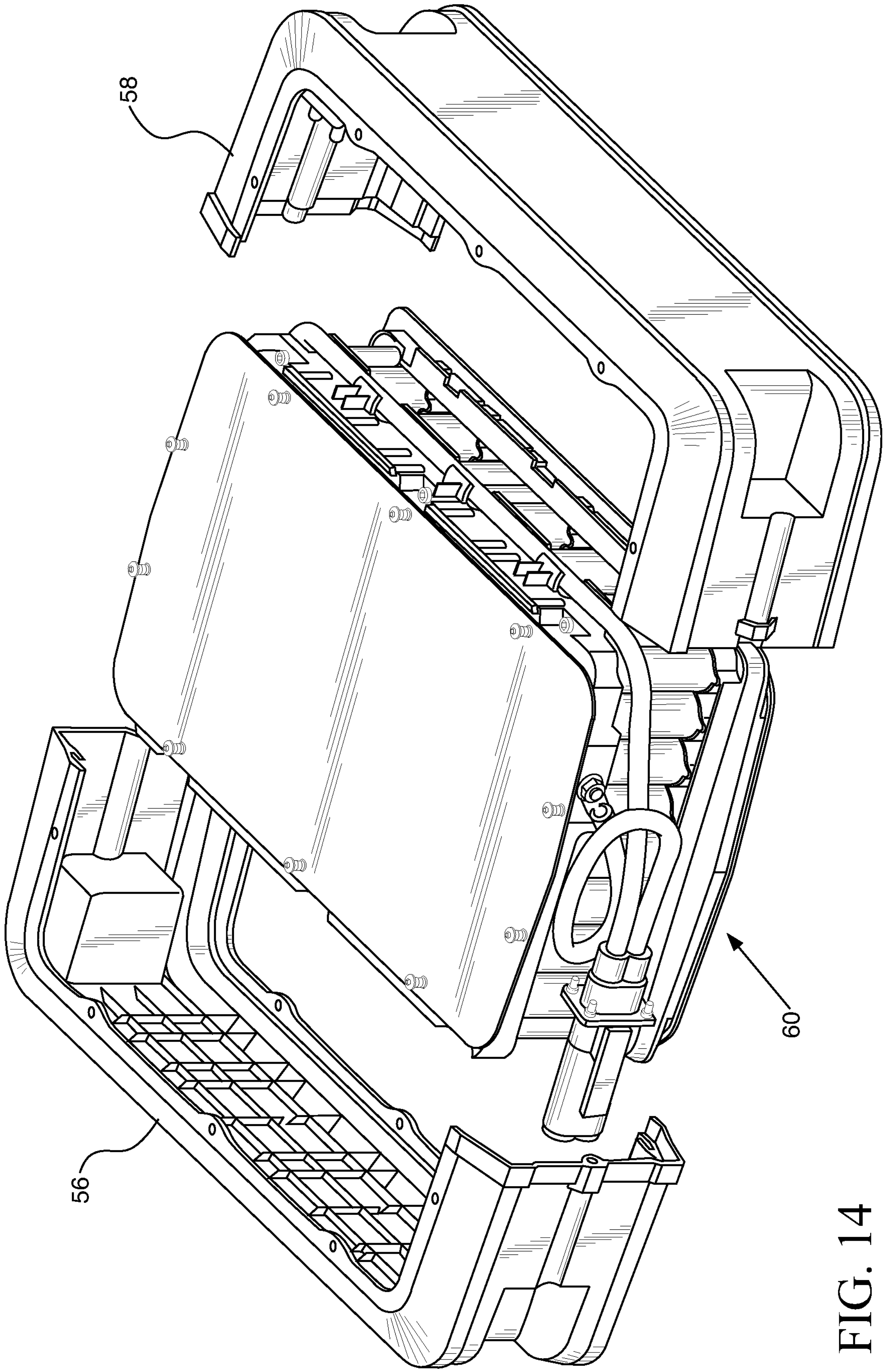
FIG. 14 is an exploded view of the modular battery pack of FIG. 1.

FIG. 14 shows wired battery holder with plates assembly 60, along with side housings 56 and 58, which are made to substantially envelope assembly 60 on four sides, and together form the modular battery pack. While the side housings may not completely envelope assembly 60 on four sides, "substantially" means that the housing will continuously wrap around four sides of the assembly, allowing for one or more holes or other openings in the housing. In addition, the side housings 56 and 58 are designed to overlap the plates and enclose the electrical connectors and wiring, except where the electrical connectors are meant to emerge from the housing to allow it to connect to other electrical connections, such that the side housings protrude the farthest in any direction. In this way, the batteries can get gain the benefit from the impact resistance of the polycarbonate side housings, while still employing the plates for structural stability and cooling. In other embodiments, the side housings are predominately plastic, meaning over 50% of the area, as viewed from the side, comprises plastic. In an embodiment, the side housings 56 and 58 will have grooves that capture the edge of one or both of first plate 50 and second plate 52, and sealant may be used to provide a watertight joint.

The modular battery pack described herein has six sides, as viewed from the first, back, top, bottom, right and left. In another embodiment, the six sides may be seen as six views where four views are each at a 90-degree angle from the first view, and a sixth view 180 degrees from the first view. The sides are made for reference only, and need not be completely straight, level or the same length, width or area. Likewise, the sides may be turned in any direction or orientation. The sides are described herein to demonstrate how many of the parts fit together, especially the plates 50 and 52, and the side housings 56 and 58. When viewed from each of these six sides however, four of the sides are made up of substantially plastic housing and two of the sides comprise plates, preferably metal plates. In further embodiments, two sides are predominately metal, and/or four sides are predominately plastic.

Figure 15:
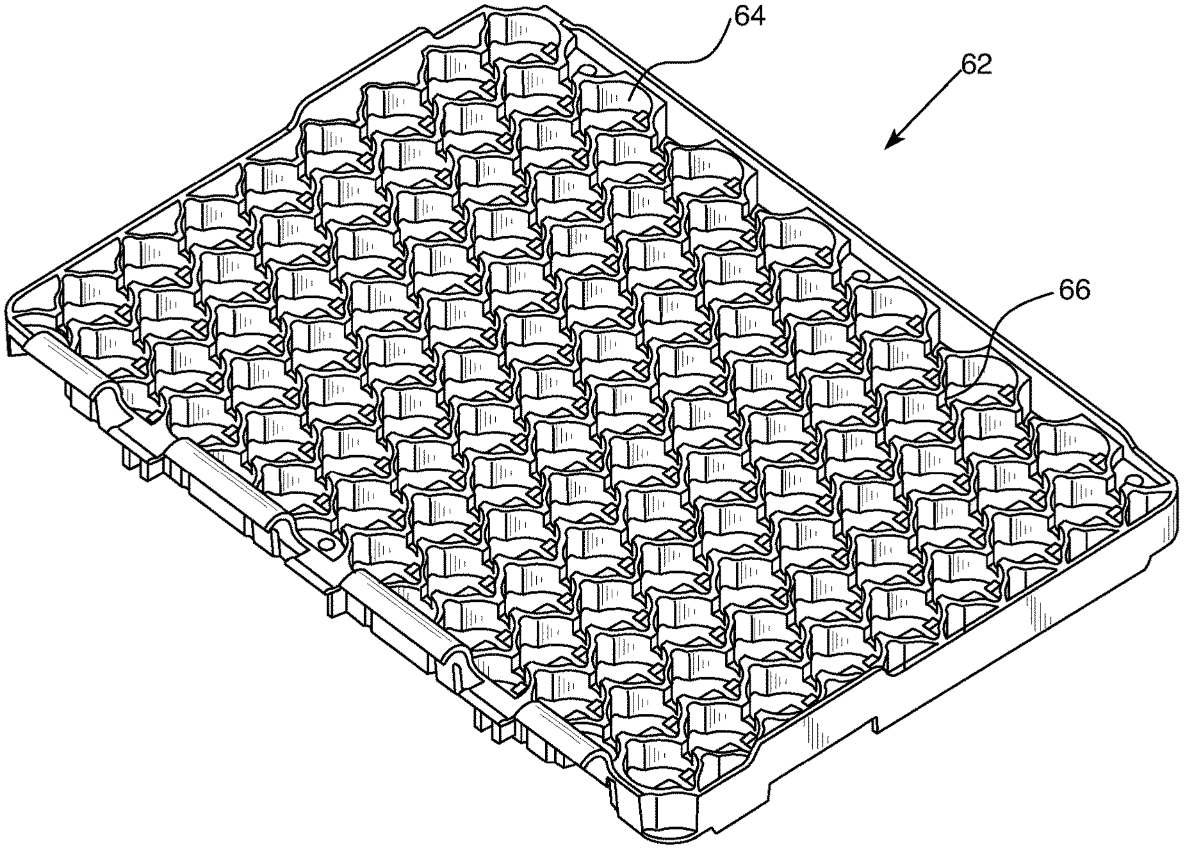
FIG. 15 is a perspective view of a first cell holder of another embodiment, showing the side facing the battery cells.
Figure 16:
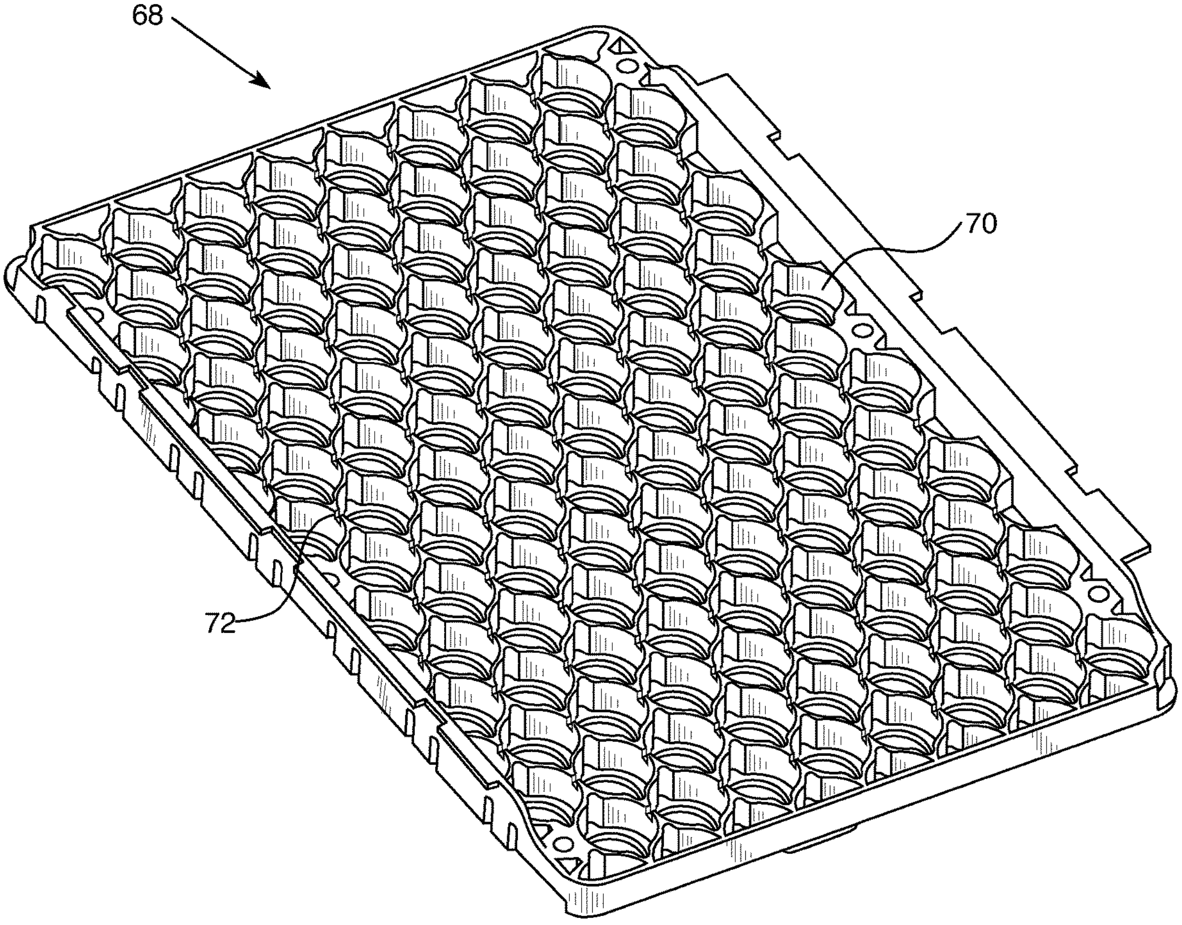
FIG. 16 is a perspective view of a second cell holder of the embodiment of FIG. 15, showing the side facing the battery cells.

In another embodiment in FIG. 15, first cell holder 62 is shown with the interior side facing up and has openings 64 for battery cells. In addition, first cell holder 62 comprises notches 66, which are aligned in such a manner that it could accommodate a long rectangular bar that may be present at the end of a prismatic or a pouch type battery. This rectangular feature would be designed into the exterior of a purpose build prismatic cell housing, or a part of an adaptor assembly for an existing prismatic or pouch cell. In this manner, first cell holder 62 can accommodate batteries of different formats, without having to alter the design of first cell holder 62. In an embodiment, different battery types are altered or fitted with a part to secure them in first cell holder 62. FIG. 16 shows second cell holder 68 with the interior side facing up and has openings 70 and notches 72. The size of notches 66 and 72 may be designed in both shape and size to accommodate the expected size and shape of battery it may support.

The modular battery pack may be connected to other modular battery packs to increase power or capacity as needed, to power electric vehicles, such as electric scooters and rickshaws, or other electric vehicles or mobile electric powered devices as needed.

Various aspects of the subject matter described herein are set out in the following numbered clauses:

Clause 1. A modular battery pack having six sides comprising: a plurality of battery cells, each cell having a first end and a second end; a first cell holder having a first side and a second side disposed opposite the first side, the first side having openings or notches to receive the first end of the battery cells; a second cell holder having a first side and a second side disposed opposite the first side, the first side having openings or notches to receive the second end of the battery cells; an electrical outlet connected to the plurality of battery cells; a first plate attached to the second side of the first cell holder; a second plate attached to the second side of the second cell holder; and a first side housing and a second side housing that together form four sides of the modular battery pack, wherein the first plate forms a fifth side of the battery pack, and wherein the second plate forms a sixth side of the battery pack.

Clause 2. The modular battery pack according to Clause 1, wherein the first cell holder comprises slats on the second side.

Clause 3. The modular battery pack according to one of Clauses 1 and 2, wherein the first cell holder comprises fittings on the second side.

Clause 4. The modular battery pack according to any one of Clauses 1 to 3, further comprising a thermally conductive adhesive in contact with a battery cell and one of the first plate and the second plate.

Clause 5. The modular battery pack according to any one of Clauses 1 to 4, further comprising bus bars in contact with one of the first cell holder and the second cell holder.

Clause 6. The modular battery pack according to any one of Clauses 1 to 5, wherein the first cell holder and the second cell holder comprise polycarbonate.

Clause 7. The modular battery pack according to any one of Clauses 1 to 6, wherein the first cell holder and the second cell holder further comprise at least one compound selected from the group consisting of acrylonitrile butadiene styrene, polytetrafluorethylene, an aromatic phosphate ester, a phosphazene, bisphenol-A diphenyl phosphate, triphenyl phosphate and resorcinol bis-diphenyl phosphate.

Clause 8. The modular battery pack according to any one of Clauses 1 to 7, wherein the first cell holder and the second cell holder comprise thermally conductive polycarbonate.

Clause 9. The modular battery pack according to any one of Clauses 1 to 8, wherein the first side housing and the second side housing are constructed of a thermoplastic.

Clause 10. The modular battery pack according to any one of Clauses 1 to 9, wherein the first side housing and the second side housing comprise polycarbonate.

Clause 11. The modular battery pack according to any one of Clauses 1 to 10, wherein the first side housing and the second side housing further comprise at least one compound selected from the group consisting of acrylonitrile butadiene styrene, polytetrafluorethylene, an aromatic phosphate ester, a phosphazene, bisphenol-A diphenyl phosphate, triphenyl phosphate and resorcinol bis-diphenyl phosphate.

Clause 12. The modular battery pack according to any one of Clauses 1 to 11, wherein the first plate or the second plate comprise a metal, preferably over 80% metal, preferably aluminum.

Clause 13. The modular battery pack according to any one of Clauses 1 to 12, wherein the first plate and the second plate comprise a metal, preferably aluminum.

Clause 14. The modular battery pack according to any one of Clauses 1 to 13, wherein the first plate or the second plate comprise thermally conductive polycarbonate.

Clause 15. The modular battery pack according to any one of Clauses 1 to 14, wherein the first plate and the second plate comprise thermally conductive polycarbonate.

Clause 16. The modular battery pack according to any one of Clauses 1 to 15, wherein the first plate or the second plate further comprise cooling channels.

Clause 17. The modular battery pack according to any one of Clauses 1 to 16, wherein each of the six sides face 90 degrees apart from four other sides, and 180 degrees apart from one other side.

Clause 18. The modular battery pack according to any one of Clauses 1 to 17, wherein two of the sides comprise metal plates and four of the sides are substantially plastic.

Clause 19. The modular battery pack according to any one of Clauses 1 to 18, wherein two of the sides are predominately metal and four of the sides are predominately plastic.

Clause 20. The modular battery pack according to any one of Clauses 1 to 19, wherein the first side housing and the second side housing substantially envelope the first plate, the second plate, the first cell holder, the second cell holder, and the battery cells.

Clause 21. The modular battery pack according to any one of Clauses 1 to 20, wherein the first side housing and the second side housing together protrude further in any direction, than the first plate and the second plate.

Clause 22. The modular battery pack according to any one of Clauses 1 to 21, further comprising foam disposed between the first cell holder and the second cell holder, preferably wherein the foam has a thermal conductivity of 1 W/m-K or greater.

Clause 23. An electric vehicle comprising a modular battery pack according to any one of Clauses 1 to 22.

What is claimed is:

1. A modular battery pack having six sides comprising:

a plurality of battery cells, each cell having a first end and a second end;

a first cell holder having a first side and a second side disposed opposite the first side, the first side having openings or notches to receive the first end of the battery cells;

a second cell holder having a first side and a second side disposed opposite the first side, the first side having openings or notches to receive the second end of the battery cells;

an electrical outlet connected to the plurality of battery cells;

a first plate attached to the second side of the first cell holder;

a second plate attached to the second side of the second cell holder;

a first side housing and a second side housing that together form four sides of the modular battery pack; and a thermally conductive adhesive in contact with a battery cell and one of the first plate and the second plate, wherein the first plate forms a fifth side of the modular battery pack, and wherein the second plate forms a sixth side of the modular battery pack.

2. The modular battery pack of claim 1, wherein the first cell holder comprises slats and fittings on the second side.

3. The modular battery pack of claim 1, further comprising bus bars in contact with one of the first cell holder and the second cell holder.

4. The modular battery pack of claim 1, wherein the first cell holder and the second cell holder comprise polycarbonate.

5. The modular battery pack of claim 4, wherein the first cell holder and the second cell holder further comprise at least one compound selected from the group consisting of acrylonitrile butadiene styrene, polytetrafluorethylene, an aromatic phosphate ester, a phosphazene, bisphenol-A diphenyl phosphate, triphenyl phosphate and resorcinol bis-diphenyl phosphate.

6. The modular battery pack of claim 4, wherein the polycarbonate comprises thermally conductive polycarbonate.

7. The modular battery pack of claim 1, wherein the first side housing and/or the second side housing comprise polycarbonate.

8. The modular battery pack of claim 7, wherein the first side housing and the second side housing further comprise at least one compound selected from the group consisting of acrylonitrile butadiene styrene, polytetrafluorethylene, an aromatic phosphate ester, a phosphazene, bisphenol-A diphenyl phosphate, triphenyl phosphate and resorcinol bis-diphenyl phosphate.

9. The modular battery pack of claim 1, wherein the first plate and/or the second plate comprise a metal.

10. The modular battery pack of claim 9, wherein the metal is aluminum.

11. The modular battery pack of claim 1, wherein the first plate and/or the second plate comprise thermally conductive polycarbonate.

12. The modular battery pack of claim 1, wherein the first plate or the second plate further comprise cooling channels.

13. The modular battery pack of claim 1, wherein each side faces 90 degrees apart from four other sides, and 180 degrees apart from one other side.

14. The modular battery pack of claim 1, wherein the first side housing and the second side housing substantially envelope the first plate, the second plate, the first cell holder, the second cell holder, and the battery cells.

15. The modular battery pack of claim 1, wherein the first side housing and the second side housing together protrude further in any direction, than the first plate and the second plate.

16. The modular battery pack of claim 1, further comprising foam disposed between the first cell holder and the second cell holder.

17. The modular battery pack of claim 16, wherein the foam has a thermal conductivity of 1 W/m-K or greater.

* * * * *